(12) United States Patent
Isono et al.

(10) Patent No.: US 8,567,240 B2
(45) Date of Patent: Oct. 29, 2013

(54) TIRE FORCE DETECTION APPARATUS

(75) Inventors: Hiroshi Isono, Mishima (JP); Shigehiro Yoshiuchi, Yawata (JP)

(73) Assignees: Toyota Jidosha Kabushiki Kaisha, Toyota (JP); Panasonic Corporation, Kadoma-shi (JP)

( * ) Notice: Subject to any disclaimer, the term of this patent is extended or adjusted under 35 U.S.C. 154(b) by 286 days.

(21) Appl. No.: 13/132,450

(22) PCT Filed: Dec. 1, 2009

(86) PCT No.: PCT/IB2009/007621
§ 371 (c)(1),
(2), (4) Date: Jun. 2, 2011

(87) PCT Pub. No.: WO2010/064123
PCT Pub. Date: Jun. 10, 2010

(65) Prior Publication Data
US 2011/0239752 A1 Oct. 6, 2011

(30) Foreign Application Priority Data
Dec. 3, 2008 (JP) .................................. 2008-308305

(51) Int. Cl.
G01M 17/02 (2006.01)
B60C 23/00 (2006.01)
B60C 23/02 (2006.01)

(52) U.S. Cl.
USPC ........................................... 73/146; 340/442

(58) Field of Classification Search
None
See application file for complete search history.

(56) References Cited

U.S. PATENT DOCUMENTS

| 4,297,877 | A | | 11/1981 | Stahl | |
|---|---|---|---|---|---|
| 5,313,828 | A | * | 5/1994 | Kotzle et al. | 73/146 |
| 5,445,036 | A | | 8/1995 | Hordnes et al. | |
| 5,913,240 | A | * | 6/1999 | Drahne et al. | 73/146 |
| 6,931,912 | B2 | * | 8/2005 | Tsuchie et al. | 73/9 |

(Continued)

FOREIGN PATENT DOCUMENTS

EP 1 749 720 A1 2/2007
JP U-55-097542 7/1980

(Continued)

OTHER PUBLICATIONS

International Search Report issued in International Application No. PCT/IB2009/007621 dated Apr. 6, 2010.

(Continued)

*Primary Examiner* — Andre Allen
*Assistant Examiner* — Jermanine Jenkins
(74) *Attorney, Agent, or Firm* — Oliff & Berridge, PLC

(57) ABSTRACT

A tire force detection apparatus estimates the force exerted on a tire at the contact point of the tire in a vehicle that includes: a tire/wheel assembly having a wheel and a tire held on an outer circumferential portion of the wheel; and a wheel support member that rotatably supports the wheel via a wheel support portion. The tire force detection apparatus includes: an elastic body disposed between the wheel and the wheel support portion, the elastic body having column portions that each abut, at opposite ends thereof, the wheel and the wheel support portion and a plate-shaped portion that is integrated with the column portions and extends around the column portions; stress detectors that detect stress applied to the elastic body by detecting a strain of the plate-shaped portion; and an electronic circuit device that calculates the force exerted on the tire, based on the stress detected.

8 Claims, 11 Drawing Sheets

(56) References Cited

U.S. PATENT DOCUMENTS

| | | | |
|---|---|---|---|
| 6,943,674 B2* | 9/2005 | Tsai | 340/442 |
| 7,028,540 B2* | 4/2006 | Morikawa | 73/146 |
| 7,706,930 B2* | 4/2010 | Corniot | 701/1 |
| 2001/0020386 A1 | 9/2001 | Mancosu et al. | |
| 2002/0014114 A1 | 2/2002 | Mancosu et al. | |
| 2003/0056579 A1 | 3/2003 | Poulbot et al. | |
| 2005/0188756 A1 | 9/2005 | Morikawa | |
| 2010/0071453 A1 | 3/2010 | Isono | |

FOREIGN PATENT DOCUMENTS

| | | |
|---|---|---|
| JP | U-57-093833 | 6/1982 |
| JP | A-02-216022 | 8/1990 |
| JP | B2-03-019494 | 3/1991 |
| JP | A-10-048072 | 2/1998 |
| JP | A-10-232188 | 9/1998 |
| JP | A-2001-304985 | 10/2001 |
| JP | A-2003-014563 | 1/2003 |
| JP | A-2005-241470 | 9/2005 |
| JP | A-2005-249517 | 9/2005 |
| WO | WO 2008/133353 A1 | 11/2008 |

OTHER PUBLICATIONS

International Preliminary Report on Patentability issued in International Application No. PCT/IB2009/007621 dated Jan. 27, 2011.

Japanese Office Action issued in Japanese Application No. 2008-308305 dated Dec. 24, 2010 (partial translation).

U.S. Office Action issued in U.S. Appl. No. 12/531,706 dated Jan. 31, 2011.

* cited by examiner

TIRE FORCE DETECTION APPARATUS

BACKGROUND OF THE INVENTION

1. Field of the Invention

The invention relates to a detection apparatus for a vehicle, such as an automobile, and more particularly to a tire force detection apparatus that detects a force exerted on a tire of a tire/wheel assembly.

2. Description of the Related Art

Various tire force detection apparatuses that detect the force exerted on a tire of a tire/wheel assembly in a vehicle, such as an automobile, have already been proposed. For example, Japanese Patent Application Publication No. 2005-241470 (JP-A-2005-241470) describes a tire force detection apparatus, in which axle-side connecting members and wheel-side connecting members are alternately disposed at four positions that are arranged in the circumferential direction around the rotation center of the tire/wheel assembly, an elastic member and load sensors for detecting the load that is applied to the elastic member are provided between the axle-side connecting members and the wheel-side connecting members, and the force exerted on the tire is calculated based on the result of detection by the load sensors.

WO2008/133353 proposed by the present applicant describes a tire force detection apparatus that has a stress detecting means that detects the stress that is applied to a connecting means for connecting a disc portion of a wheel of a tire/wheel assembly and a wheel support portion of a wheel support member, and a calculation means that calculates the tire force based on the stress detected.

In the tire force detection apparatus described in JP-A-2005-241470, stress is transmitted between the wheel-side connecting members and the axle-side connecting members through the elastic member. In the tire force detection apparatus described in WO2008/133353, stress is transmitted between the disc portion of the wheel and the wheel support portion through the connecting means and the stress applied to the elastic member and the connecting means are detected.

Thus, when the stiffness of the elastic member and the connecting means is set low so as to increase the S/N ratio in detecting the force exerted on the tire, the mounting stiffness of the tire/wheel assembly is reduced. On the other hand, when the stiffness of the elastic member and the connecting means is set high in order to secure a favorable mounting stiffness of the tire/wheel assembly, the S/N ratio in detecting the force exerted on the tire is reduced and it becomes difficult to detect the force exerted on the tire with high accuracy.

SUMMARY OF THE INVENTION

The invention has been made in light of the problems as described above in a conventional tire force detection apparatus that is configured so that all the stress that is transmitted between a wheel-side member and an axle-side member is transmitted through an intermediate member, such as an elastic member and a connecting member, and the stress applied to the intermediate member is detected. The invention provides a tire force detection apparatus that increases the strain due to the stress applied to an elastic body interposed between a wheel-side member and an axle-side member and detects the increased strain, thereby detecting the force exerted on the tire with higher accuracy as compared to the conventional tire force detection apparatus while securing a favorable mounting stiffness of the tire/wheel assembly.

A first aspect of the invention is a tire force detection apparatus for detecting a force exerted on a tire at a contact point of the tire, characterized by including: a tire/wheel assembly that has a wheel having a disc portion that extends perpendicularly to a rotation axis of the tire/wheel assembly and a tire that is held on an outer circumferential portion of the wheel; a wheel support member for supporting the wheel via a wheel support portion so that the wheel can rotate about the rotation axis, the wheel support portion being supported by a vehicle body so as to be able to rotate about the rotation axis and extending perpendicularly to the rotation axis; a connecting member that connects the disc portion of the wheel and the wheel support portion of the wheel support member; an elastic body disposed between the disc portion and the wheel support portion, the elastic body having a column portion that extends in parallel with the rotation axis and that abuts, at opposite ends thereof, the disc portion and the wheel support portion and a plate-shaped portion that is integrated with the column portion between the opposite ends and extends around the column portion; a stress detector that detects stress applied to the elastic body by detecting a strain of the plate-shaped portion; and a calculation unit that calculates the force exerted on the tire, based on the stress detected.

According to the above first aspect, an elastic body is disposed between the disc portion of the wheel and the wheel support portion of the wheel support member. The elastic body includes: a column portion that extends in parallel with the rotation axis of the tire/wheel assembly and that abuts, at opposite ends thereof, the disc portion and the wheel support portion; and a plate-shaped portion that is integrated with the column portion between the opposite ends and extends around the column portion. Stress applied to the elastic body is detected by detecting a strain of the plate-shaped portion and the force exerted on the tire is calculated based on the stress detected.

Thus, the strain of the column portion due to the stress applied to the elastic body is amplified in the plate-shaped portion and the stress applied to the elastic body is detected by detecting the amplified strain. For this reason, as compared to the case where the plate-shaped portion is not provided and the strain of the column portion is detected, the S/N ratio in detecting the stress applied to the elastic body is increased and the force exerted on the tire is detected with high accuracy.

In addition, it is made unnecessary to excessively reduce the stiffness of the elastic body to increase the S/N ratio in detecting the stress applied to the elastic body. Thus, as compared to the case where the plate-shaped portion is not provided and the strain of the column portion is detected, it is possible to make the stiffness of the column portion higher and therefore, it is possible to firmly connect the disc portion of the wheel and the wheel support portion of the wheel support member, so that favorable mounting stiffness of the tire/wheel assembly is secured.

In the above first aspect, a configuration may be employed, in which the elastic body has a plurality of column portions that are disposed spaced apart from each other around the rotation axis and the plate-shaped portion integrally connects each pair of the column portions that are adjacent to each other in a circumferential direction.

According to the above configuration, the elastic body has a plurality of column portions that are disposed spaced apart from each other around the rotation axis and the plate-shaped portion integrally connects each pair of the column portions that are adjacent to each other in the circumferential direction. Thus, as compared to the case where the plurality of column portions are not integrally connected by the plate-shaped portion, it is possible to reduce the number of parts and easily and efficiently install the elastic body.

In addition, movement of the plate-shaped portion in a region in the vicinity of one column portion is restricted by the column portion adjacent thereto in the circumferential direction and therefore, as compared to the case where a plurality of column portions are not integrally connected by the plate-shaped portion, the amount of elastic deformation of the plate-shaped portion is increased, so that it is possible to increase the S/N ratio in detecting the stress applied to the elastic body.

In the above first aspect, a configuration may be employed, in which the plate-shaped portion has a stress concentration portion that increases the strain of the plate-shaped portion in a region, in which the stress detector is provided, by concentrating the stress that is applied to the plate-shaped portion due to the stress applied to the elastic body.

According to the above configuration, in the plate-shaped portion, the stress applied to the plate-shaped portion due to the stress applied to the elastic body is concentrated at the stress concentration portion and the strain of the plate-shaped portion in the region in which the stress detector is provided is increased due to stress concentration. Thus, as compared to the case where the stress concentration portion is not provided, the S/N ratio in detecting the stress applied to the elastic body is increased and it is therefore possible to increase the stiffness of the column portion that is essential in obtaining the desired stress detection accuracy.

In the above first aspect, a configuration may be employed, in which the stress detector is disposed, with respect to the axis of the column portion, in a direction perpendicular to a radial direction of the tire/wheel assembly when viewed along the rotation axis.

In general, when the disc portion of the wheel and the wheel support portion of the wheel support member rotate relative to each other about the rotation axis, the strain of the column portions and the plate-shaped portion is large in the regions that are located, with respect to the axis of the column portion, in the direction perpendicular to the radial direction of the tire/wheel assembly.

According to the above configuration, the stress detector is disposed, with respect to the axis of the column portion, in a direction perpendicular to the radial direction of the tire/wheel assembly when viewed along the rotation axis, so that it is possible to efficiently detect the stress applied to the elastic body when the disc portion of the wheel and the wheel support portion of the wheel support member rotate relative to each other about the rotation axis.

In the above first aspect, a configuration may be employed, in which the connecting member extends in parallel with the rotation axis and the column portion is a hollow cylinder, through which the connecting member passes.

According to the above configuration, the connecting member extends in parallel with the rotation axis and the column portion is a hollow cylinder, through which the connecting member passes, so that it is possible to estimate the stress applied to the connecting member by detecting the stress applied to the elastic body and it is therefore possible to estimate the force exerted on the tire based on the stress applied to the connecting member.

Alternatively, in the above first aspect, a configuration may be employed, in which the column portion is disposed, with respect to the connecting member, in a circumferential direction about the rotation axis.

According to the above configuration, the column portion is disposed, with respect to the connecting member, in a circumferential direction about the rotation axis, so that the position and the number of the elastic body(ies) can be set without any restriction imposed by the position and the number of the connecting member(s) and the force exerted on the tire is estimated based on the stress applied to the elastic body. In addition, the column portion is not limited to a hollow one but may have a solid structure.

In the above first aspect, a configuration may be employed, in which the tire force detection apparatus further includes a compressive stress limiting member that bears at least part of compressive stress that is applied from the disc portion and the wheel support portion to the column portion, thereby limiting compressive stress that is applied to the column portion.

According to the above configuration, a compressive stress limiting member bears at least part of compressive stress that is applied from the disc portion and the wheel support portion to the column portion, thereby limiting compressive stress that is applied to the column portion. Thus, as compared to the case where the compressive stress limiting member is not provided, it is possible to make the stiffness of the elastic body lower while securing the firm connection between the disc portion of the wheel and the wheel support portion of the wheel support member by the connecting member. Thus, it is possible to increase the accuracy in detecting the force exerted on the tire while securing a more favorable mounting stiffness of the tire/wheel assembly.

In the above first aspect, a configuration may be employed, in which the calculation unit calculates the stress that is applied in a rotation direction of the tire/wheel assembly at the elastic body based on the stress applied to the elastic body and calculates a force that is exerted on the tire in a longitudinal direction at the contact point of the tire, based on the stress applied in the rotation direction of the tire/wheel assembly.

According to the above configuration, the force exerted on the tire in the longitudinal direction at the contact point of the tire, that is, the longitudinal force is reliably and accurately calculated.

According to a second aspect of the invention, in the first embodiment described above, the stress detector is configured to detect the stress applied to the elastic body in the rotation direction of the tire/wheel assembly.

According to a third aspect of the invention, in the first aspect described above, the plate-shaped portion extends perpendicularly to the axis of the column portion.

According to a fourth aspect of the invention, in the first aspect described above, the elastic body has a plurality of column portions that are arranged at regular intervals around the rotation axis.

According to a fifth aspect of the invention, in the fourth aspect described above, the elastic body has four column portions arranged at 90-degree intervals around the rotation axis.

According to a sixth aspect of the invention, in the first aspect described above, the tire force detection apparatus has a plurality of stress detectors that detect the strain of the plate-shaped portion around the column portions to detect the stress applied to the elastic body in the rotation direction of the tire/wheel assembly for each column portion and the calculation unit is configured to calculate the force exerted on the tire in the longitudinal direction based on the sum of the stresses that are applied to the column portions of the elastic body in the rotation direction of the tire/wheel assembly.

According to a seventh aspect of the invention, in the first aspect described above, the plate-shaped portion integrally connects all the column portions.

According to an eighth aspect of the invention, in the first aspect described above, the stress detector is configured to detect the strain of the surface portion of the plate-shaped portion in the direction perpendicular to the axis of the column portion.

According to a ninth aspect of the invention, in the first aspect described above, a pair of the stress detectors are provided on opposite sides of the axis of each of the column portions.

According to a tenth aspect of the invention, in the ninth aspect described above, the pair of the stress detectors are provided on the surface of the plate-shaped portion on the same side with respect to the center of the thickness of the plate-shaped portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described below in detail with reference to the attached drawings.
(First Embodiment)

Figure 1:
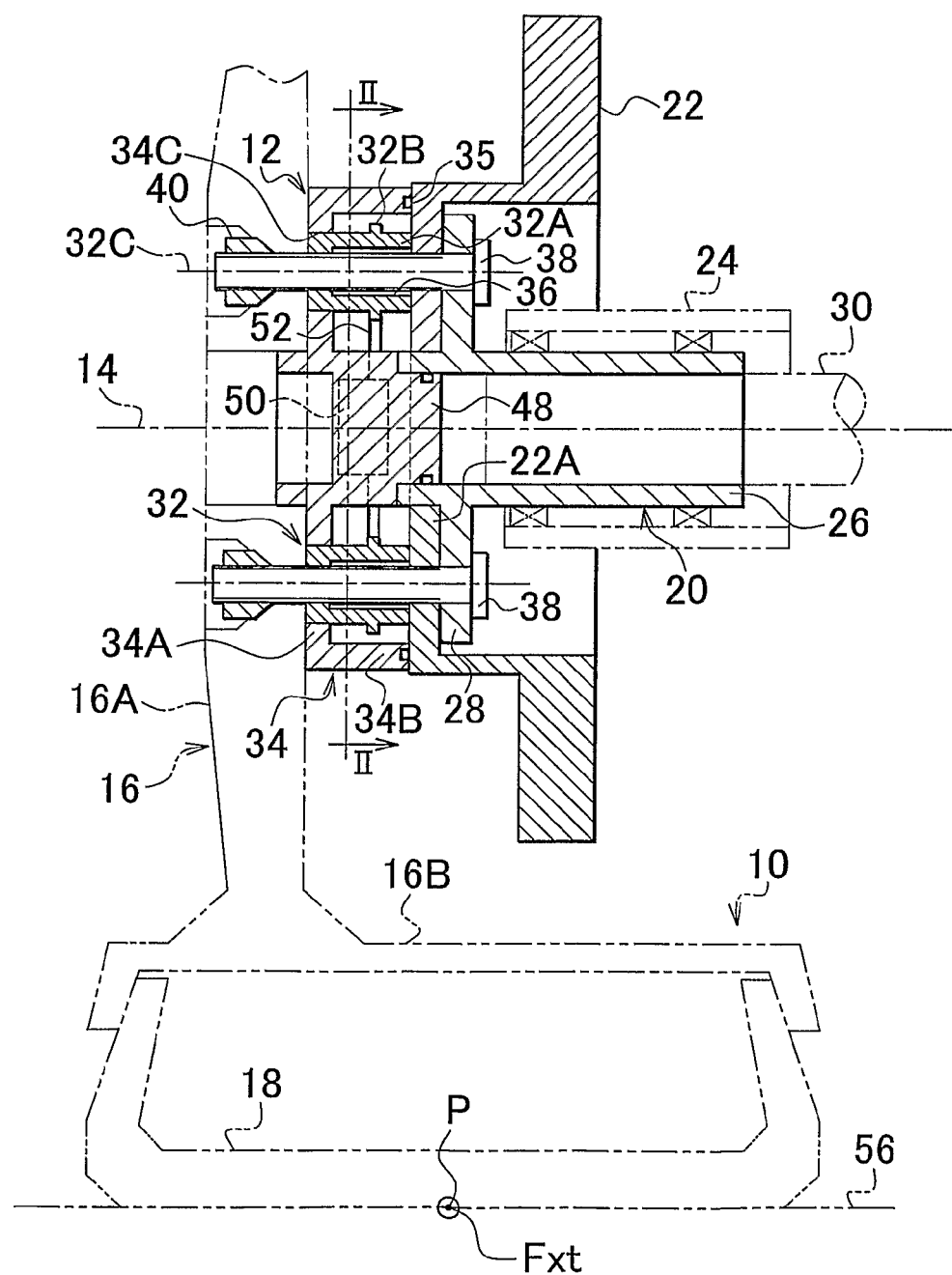
FIG. 1 is a sectional view taken along the cutting plane (the line I-I of FIG. 2) that passes a rotation axis of a tire/wheel assembly, showing a first embodiment of a tire force detection apparatus according to the invention that is applied to a driving wheel.
Figure 2:
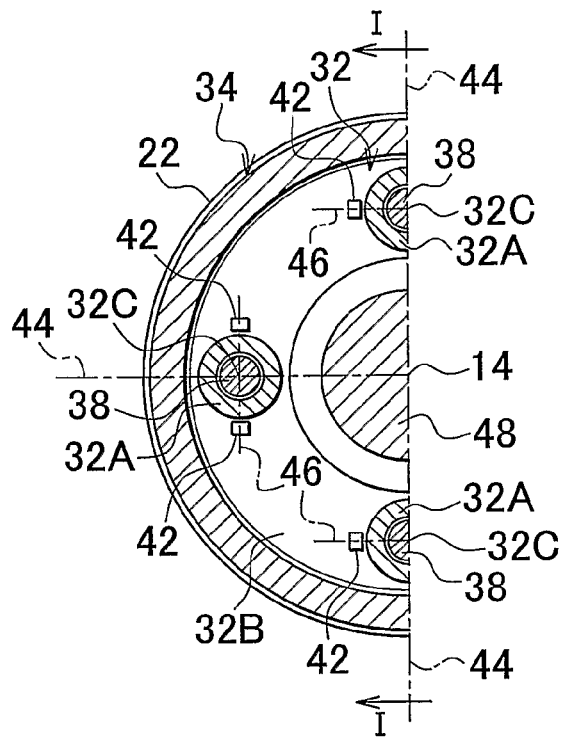
FIG. 2 is a sectional view taken along the line of FIG. 1, showing a main portion of the first embodiment.

FIG. 1 is a sectional view taken along the cutting plane (the line I-I of FIG. 2) that passes a rotation axis of the tire/wheel assembly, showing a first embodiment of a tire force detection apparatus for detecting a force exerted on a tire according to the invention that is applied to a driving wheel. FIG. 2 is a sectional view taken along the line II-II of FIG. 1, showing a main portion of the first embodiment.

In FIG. 1, reference numeral 10 designates a tire/wheel assembly of a vehicle (not shown) and reference numeral 12 designates the tire force detection apparatus. The tire/wheel assembly 10 has a wheel 16 made of metal that has a disc portion 16A that extends perpendicularly to the rotation axis 14 and a tire 18 chiefly made of rubber that is supported by a peripheral rim portion 16B of the wheel 16. The tire/wheel assembly 10 is supported by a hub member 20 so as to be rotatable about the rotation axis 14. The tire force detection apparatus 12 is disposed, along with a brake rotor disc 22, between the tire/wheel assembly 10 and the hub member 20.

The hub member 20 has a cylindrical shaft portion 26 that is supported by a bearing 24 so as to be rotatable about the rotation axis 14 and a flange portion 28 that is integrally formed with the shaft portion and is perpendicular to the rotation axis 14. Although not shown in FIG. 1, the bearing 24 is supported by a vehicle body through a suspension member. The tire/wheel assembly 10 is the driving wheel and a driving shaft 30 is inserted into the shaft portion 26 from the side opposite to the tire/wheel assembly 10. The driving shaft 30 extends along the rotation axis 14 so as to be rotatable about the rotation axis 14 and is firmly connected to the shaft portion 26 by press fitting or the like. The tire/wheel assembly to which the tire force detection apparatus of the invention is applied may be a driven wheel.

The hub member 20 functions as the wheel supporting member in conjunction with a disc portion 22A of the brake rotor disc 22. The flange portion 28 defines the wheel supporting portion in conjunction with the disc portion 22A. An annular elastic body 32 is disposed coaxially with the rotation axis 14 between the disc portion 16A and the disc portion 22A. The elastic body 32 includes four substantially cylindrical column portions 32A arranged at 90-degree intervals about the rotation axis 14 and a plate-shaped portion 32B that is integral with the column portions 32A and extends around the column portions. The plate-shaped portion 32B is provided at a middle position between the opposite longitudinal ends of the column portion 32A.

The hub member 20 and the brake rotor disc 22 may be made of a metallic material with high strength and high stiffness, such as ferroalloy. The wheel 16 may be made of a metallic material with relatively high strength and relatively high stiffness, such as aluminum alloy or ferroalloy. The elastic body 32 may be made of a metallic material with relatively high elasticity, such as aluminum alloy.

Axes 32C of the column portions 32A extend in parallel with the rotation axis 14 and the two ends of the column portions 32A abut the disc portion 16A and the disc portion 22A. The plate-shaped portion 32B extends annularly around the rotation axis 14 and perpendicularly to the rotation axis 14 and integrally connects the four column portions 32A. The plate-shaped portion 32B has an inner diameter greater than that of the shaft portion 26 of the hub member 20 and has an outer diameter smaller than that of the disc portion 22A of the brake rotor disc 22.

A cover member 34 is disposed between the disc portion 16A and the disc portion 22A. The cover member 34 has a disc portion 34A and a cylindrical portion 34B that are integral with each other. The disc portion 34A has holes 34C that receive the column portions 32B in a close-contact manner, and abuts the disc portion 16A. The cylindrical portion 34B extends in parallel with the rotation axis 14 around the elastic body 32 and abuts the disc portion 22A at the end portion on the side opposite to the disc portion 34A. An O-ring seal 35 for preventing the entrance of muddy water and/or dust into the inside of the cover member 34 through the gap between the cylindrical portion 34B and the disc portion 22A is disposed on the end surface of the cylindrical portion 34B.

A hole 36 with a circular cross section that extends along the axis 32C is provided in each of the column portions 32A. A bolt 38 that functions as the connecting means is passed through each of the holes 36. The axis of each of the bolts 38 extends along the axis 32C and is aligned therewith. The head portion of each of the bolts 38 is fixed on the inner surface of the flange portion 28. In the embodiment shown in FIG. 1, the hole 36 has a large-diameter portion that receives the bolt 38 in a loose-fitting manner and a small-diameter portion that receives the bolt 38 in a substantially close-contact manner.

Each of the bolts 38 is passed through the flange portion 28 of the hub member 20, the disc portion 22A of the brake rotor disc 22, the column portion 32A of the elastic body 32, and the disc portion 16A of the wheel 16 and extends to the outside of the disc portion 16A. The elastic body 32 and the cover member 34 are compressed between the disc portion 16A and the disc portion 22A by the bolts 38 and nuts 40 that are screwed onto the bolts 38. The disc portion 16A is firmly and integrally connected to the flange portion 28 and the brake rotor disc 22.

Detector elements 42 are fixed on the surface of the plate-shaped portion 32B of the elastic body 32 in the vicinity of the column portions 32A. As shown in FIG. 2, for each of the column portions 32A, the detector elements 42 are provided at the positions that are located in the direction perpendicular to the radial direction of the tire/wheel assembly relative to the axis 32C, that is, the positions on a straight line 46 extending perpendicularly to a plane 44 that passes the rotation axis 14 and the axis 32C. In the embodiment shown in the drawings, the detector elements 42 are provided on opposite sides of each of the column portions 32A in the direction along the straight line 46 on the same side with respect to the center of the plate-shaped portion 32B in the thickness direction thereof.

Figure 3:
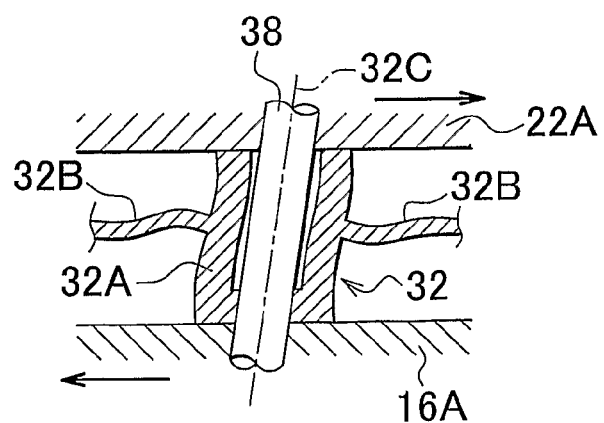
FIG. 3 is an explanatory diagram showing the elastic deformation of a plate-shaped portion in an exaggerated manner when shearing stress is applied to a column portion in the first embodiment.

As shown in FIG. 3 in which the deformation is exaggerated, when the disc portion 16A and the disc portion 22A are rotated relative to each other about the rotation axis 14 by the torque applied to the tire/wheel assembly 10 and the hub member 20, shearing stress is applied to the column portions 32A of the elastic body 32, so that the axes 32C are inclined with respect to the disc portion 16A and the disc portion 22A. Thus, the portions of the plate-shaped portion 32B on opposite sides of the column portion 32A in the circumferential direction of the elastic body 32 are elastically bent, so that the concave surface portion is subjected to compressive deformation, whereas the convex surface portion is subjected to tensile deformation.

The amount of elastic deformation of the plate-shaped portion 32B is proportional to the shearing stress that is applied to the column portions 32A. The shearing stress that is applied to the column portions 32A is proportional to the torque transmitted between the tire/wheel assembly 10 and the hub member 20 through the bolts 38. Thus, it is possible to estimate the force in the circumferential direction that is transmitted by the bolt 38 between the disc portion 16A and the disc portion 22A at the position of the corresponding column portion 32A by detecting the amount of elastic deformation of the plate-shaped portion 32B on the opposite sides of the column portion 32A.

Each of the detector elements 42 functions as a stress detector that, like a resistance strain gauge, outputs an electric current signal indicating the electric current value corresponding to the elastic strain of the plate-shaped portion 32B in the direction along the straight line 46, thereby detecting the stress that is applied to the surface portion of the plate-shaped portion 32B along the straight line 46 on opposite sides of each of the bolts 38 in the circumferential direction. The cover member 34 has a small-diameter portion 48 that is aligned with the rotation axis 14. The outer end portion of the shaft portion 26 of the hub member 20 is partially fitted onto the small-diameter portion 48. An electronic circuit device 50, which functions as the calculation unit, is disposed in the center portion of the cover member 34. The electric current signal that is output from each of the detector elements 42 is supplied to the electronic circuit device 50 via a lead 52.

It can be considered that the stress that causes compressive deformation of the surface portion of the plate-shaped portion 32B into a concave form and the stress that causes tensile deformation of the surface portion of the plate-shaped portion 32B into a convex form have the same magnitude and are opposite to each other. In addition, the deformations on the opposite sides of each of the column portions 32A in the direction along the straight line 46 are reverse to each other. Thus, the pair of detector elements 42 that are provided associated with each of the column portions 32A detect, on the same side of the plate-shaped portion 32B, the elastic strains, of which the positive directions are opposite to each other along the straight line 46.

As described later, the electronic circuit device 50 calculates forces Fx1 to Fx4 in the circumferential direction that act on the disc portion 16A and the disc portion 22A at the positions of the bolts 38, based on the electric current signals received from the detector elements 42. The electronic circuit device 50 then calculates a force Fxt in the longitudinal direction (longitudinal force) that is perpendicular to the rotation axis 14, the longitudinal force Fxt being exerted by a road surface 56 on the tire 18 at the center P of the contact surface of the tire 18 based on the above forces Fx1 to Fx4 and the electronic circuit device 50 then outputs the signal indicating the longitudinal force Fxt to a controller of the vehicle that is not shown in the drawings.

Figure 4:
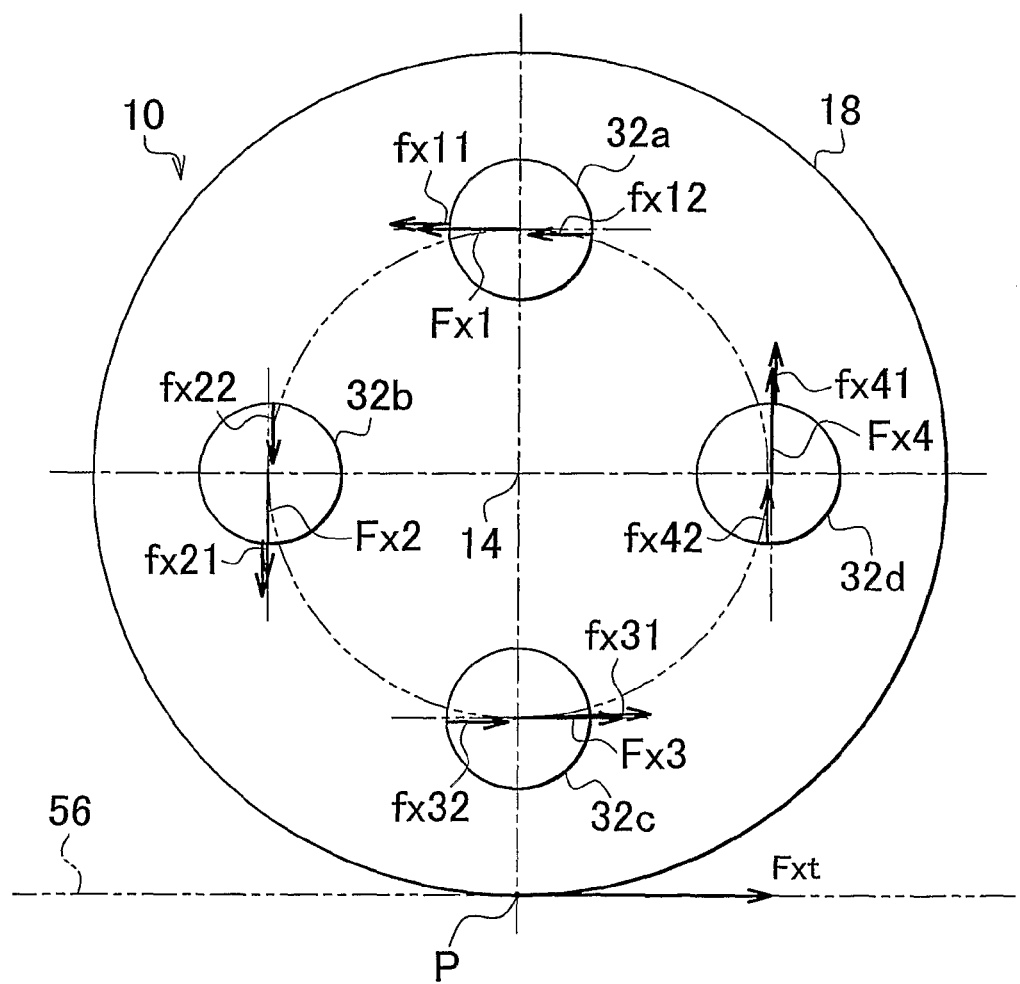
FIG. 4 is an explanatory diagram showing the stresses that are detected by detector elements in the first embodiment when viewed from a hubcap side of the tire/wheel assembly.

FIG. 4 is an explanatory diagram showing the stresses that are detected by the detector elements 42 in the first embodiment when viewed from the hubcap side of the tire/wheel assembly 10. As shown in FIG. 4, it is assumed that the four bolts 38 are bolts 38a to 38d and the stresses detected by the detector elements 42 that are positioned on the counterclockwise direction side of the bolts 38a to 38d are fx11, fx21, fx31, and fx41, respectively. In addition, it is assumed that the stresses that are detected by the detector elements 42 that are positioned on the clockwise direction side of the bolts 38a to 38d are fx12, fx22, fx32, and fx42, respectively.

The electronic circuit device 50 calculates the stresses Fx1 to Fx4 that are applied to the centers of the bolts 38a to 38d in the rotation direction of the tire/wheel assembly 10 with the use of the following equations (1) to (4): $Fx1=(fx11+fx12)/2$ ... (1); $Fx2=(fx21+fx22)/2$ ... (2); $Fx3=(fx31+fx32)/2$ ... (3); and $Fx4=(fx41+fx42)/2$ ... (4).

When the coefficient determined based on the rotation radius of the tire/wheel assembly 10, the distance between the rotation axis 14 and the axis 32C, etc. is Ax (positive constant), the longitudinal force Fxt that is exerted by the road surface 56 on the tire 18 at the center P of the contact surface of the tire 18 is expressed by the equation (5) below. Thus, the electronic circuit device 50 calculates the longitudinal force Fxt that is exerted on the tire 18, with the use of the following equation (5): $Fxt=Ax(Fx1+Fx2+Fx3+Fx4) \ldots$ (5)

The column portions 32A receive vertical shearing force due to the vertical force exerted on the tire/wheel assembly 10, so that the forces an to fx41 and fx12 to fx42 detected by the detector elements 42 have error components due to the vertical shearing force. However, the directions of the error components due to the vertical shearing force are opposite to each other on opposite sides of the rotation axis 14 of the tire/wheel assembly 10 in the horizontal direction. Thus, calculation of the equation (5) results in elimination of the error components due to the vertical shearing force.

Bending stress is applied to the column portions 32A due to the lateral force exerted on the tire/wheel assembly 10 and the forces fx11 to fx41 and fx12 to fx42 detected by the detector elements 42 contain the error components due to the bending stress. However, the directions of the error components due to the bending stress are opposite to each other on opposite sides of the rotation axis 14 of the tire/wheel assembly 10 in the vertical direction. Thus, calculation of the equations (1) to (5) results in elimination of the error components due to the bending stress.

Accordingly, it is possible to accurately calculate the longitudinal force Fxt that is exerted on the tire 18 without being affected by the vertical direction force and/or the lateral force exerted on the tire/wheel assembly 10 and such operations and effects are achieved also in the case of the other embodiments described later.

According to the first embodiment shown in the drawings, when a torque is exerted on the wheel 16 or the hub member 20, shearing stress is applied to the column portions 32A of the elastic bodies 32 and it is possible to determine the stresses Fx1 to Fx4 in the rotation direction of the tire/wheel assembly 10 that are applied to the positions of the respective bolts 38 based on the strains that accompany the elastic deformation of the plate-shaped portion 32B due to the occurrence of the shearing stress. In addition, it is possible to accurately calculate the longitudinal force Fxt that is exerted by the road surface 56 on the tire 18 based on these stresses.

In particular, according to the first embodiment, the cover member 34 is disposed between the disc portion 16A and the disc portion 22A and bears at least part of the compressive stress applied by the disc portions 16A and 22A. Thus, the cover member 34 functions as the compressive stress limiting means that limits the compressive stress that is applied to the column portions 32A of the elastic body 32.

Thus, as compared to the case where the compressive stress that is applied to the column portions 32A is not limited by the cover member 34, it is possible to reduce the stiffness of the elastic body 32 while securing the firm connection between the disc portion 16A of the wheel 16 and the flange portion 28 of the hub member 20. Thus, it is possible to increase the accuracy in detecting the tire force while securing favorable mounting stiffness of the tire/wheel assembly 10. Such operations and effects are achieved also in the cases of fourth and fifth embodiments described later.

According to the first embodiment, a pair of the detection elements 42 are provided on the same side surface of the plate-shaped portion 32B on opposite sides of each of the column portions 32A in the circumferential direction of the tire/wheel assembly 10. The stresses Fx1 to Fx4 that are applied to the centers of the bolts 38*a* to 38*d* in the rotation direction of the tire/wheel assembly 10 are calculated in the form of the average values of the stresses that are detected by each pair of the detector elements 42, with the use of the above equations (1) to (4).

Thus, as compared to the case where one detector element 42 is provided in the vicinity of each of the column portions 32A, it is possible to more accurately determine the stresses Fx1 to Fx4 that are applied to the elastic body 32 at the positions of the respective column portions 32A. In addition, as compared to the case where the detector elements 42 are provided for part of the column portions 32A, it is possible to more accurately calculate the longitudinal force Fxt that is exerted on the tire 18. Such operations and effects are achieved also in the cases of the other embodiments described later.

According to the first embodiment, the column portions 32A are integrally connected to each other by the plate-shaped portion 32B and the elastic body 32 is therefore a single part. Thus, as compared to the case where the plate-shaped portion 32B exists merely partially around the column portions 32A and the four column portions 32A are therefore not integrally connected by the plate-shaped portion 32B, it is possible to reduce the number of parts of the elastic body 32 and it is easier to install the elastic body 32. Such operations and effects are achieved also in the cases of the other embodiments described later, except the fourth embodiment.

According to the first embodiment, the column portions 32A are substantially closely fitted onto the bolts 38 at the small diameter portions of the holes 36. Thus, it is possible to easily and reliably align the axis 32C of each of the column portions 32A with the axis of the corresponding bolt 38. Thus, it is possible to easily and reliably position the elastic body 32 relative to the disc portions 16A and 22A and in addition, it is possible to accurately determine the stresses Fx1 to Fx4 that are applied to the elastic body 32 at the positions of the respective column portions 32A.

Although the cover member 34 functions also as the compressive stress limiting means that limits the compressive stress that is applied to the column portions 32A of the elastic body 32 in the first embodiment shown in the drawings, a modification may be made so that the cover member 34 does not function as the compressive stress limiting means. Specifically, a modification may be made so that the column portions 32A pass through and extend beyond the disc portion 34A of the cover member 34 and the cover member 34 therefore does not bear the compressive stress applied by the disc portions 16A and 22A.

(Second Embodiment)

Figure 5:
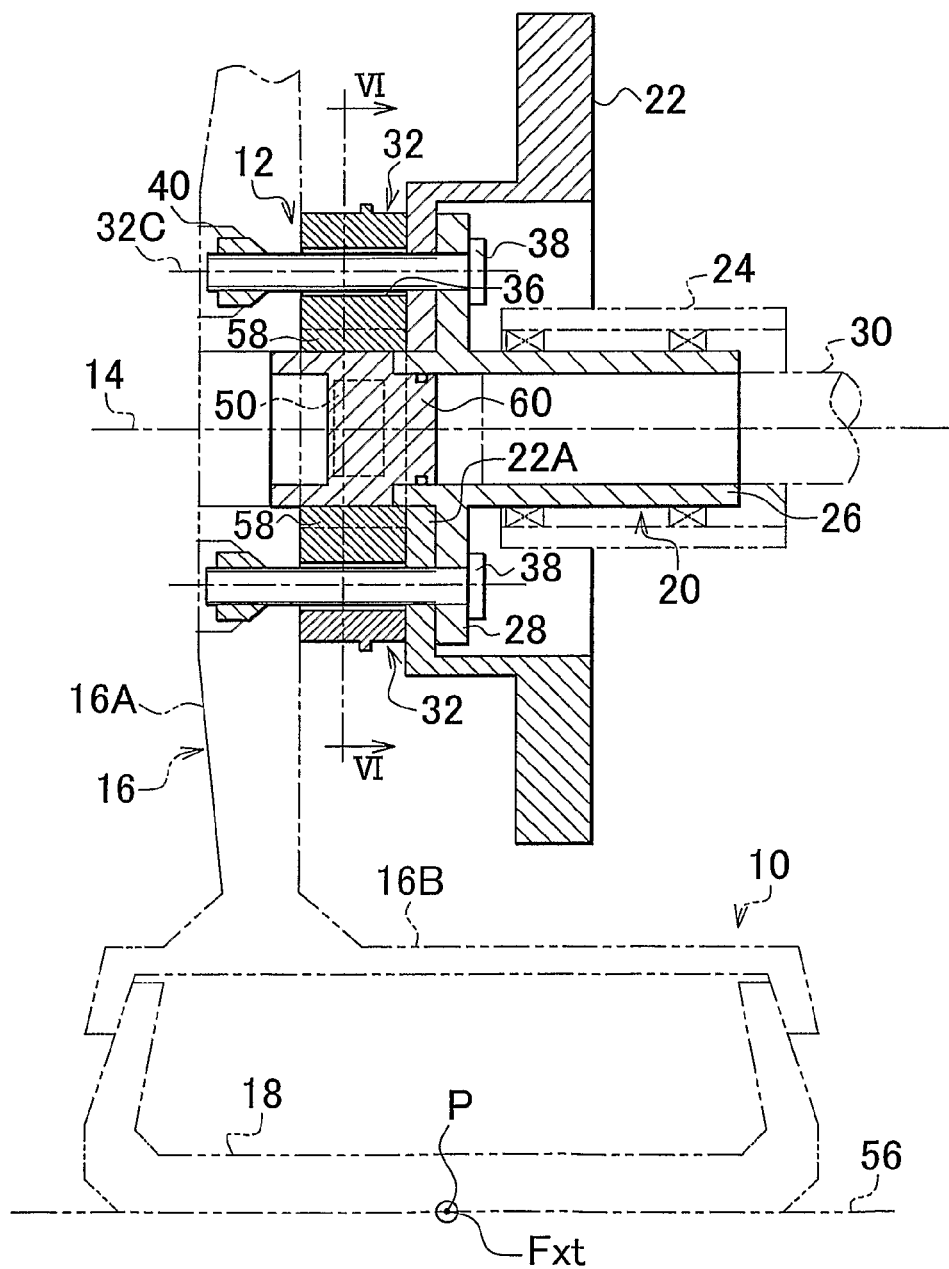
FIG. 5 is a sectional view taken along the cutting plane (the line V-V of FIG. 6) that passes the rotation axis of the tire/wheel assembly, showing a second embodiment of the tire force detection apparatus according to the invention.
Figure 6:
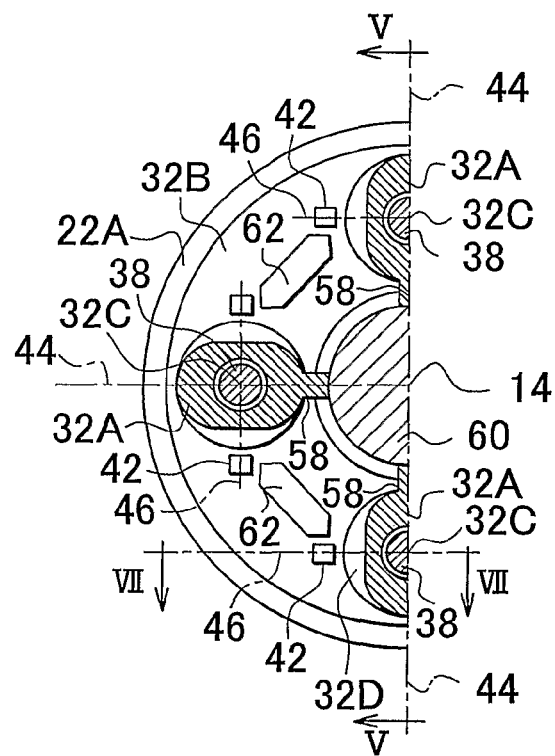
FIG. 6 is a sectional view taken along the line VI-VI of FIG. 5, showing a main portion of the second embodiment.
Figure 7:
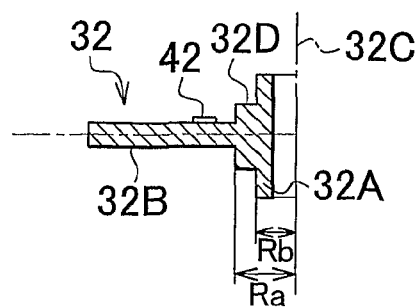
FIG. 7 is a sectional view taken along the line VII-VII of FIG. 6, showing an elastic body of the second embodiment.

FIG. 5 is a sectional view taken along the cutting plane (the line V-V of FIG. 6) that passes the rotation axis of the tire/wheel assembly, showing a second embodiment of the tire force detection apparatus according to the invention. FIG. 6 is a sectional view taken along the line VI-VI of FIG. 5, showing a main portion of the second embodiment. FIG. 7 is a sectional view taken along the line VII-VII of FIG. 6, showing an elastic body of the second embodiment.

In FIGS. 5 to 7, the members the same as the members shown in FIGS. 1 and 2 are designated by the same reference numerals used in FIGS. 1 and 2. The construction is the same as that of the above-described first embodiment except the portions described in relation to the second embodiment. This applies also in the other embodiments described later.

In the second embodiment, no member corresponding to the cover member 34 of the first embodiment described above is provided. The hole 36 provided in the column portion 32A of the elastic body 32 has a constant diameter throughout its length and the diameter of the hole 36 is greater than the diameter of the bolt 38, so that the hole 36 receives the bolt 38 in a loose-fitting manner.

The column portion 32A of the elastic body 32 has an oval cross section elongated in the radial direction of the tire/wheel assembly 10. In the portions other than the opposite ends of each of the column portions 32A along the major axis thereof, the column portions 32A of the elastic body 32 are connected to the plate-shaped portion 32B through base portions 32D that have a circular cross section. The thickness of the base portion 32D is shorter than the length of the column portion 32A along the axis 32C and greater than the thickness of the plate-shaped portion 32B. The radius Ra of the base portion 32D is half of the major axis of the column portion 32A and therefore, the radius Ra is set to a value greater than a length Rb that is half of the minor axis of the column portion 32A.

The column portions 32A each have a positioning protrusion 58 at the radially inner end thereof and the positioning protrusion 58 extends radially inwardly from the column portion 32A. The tips of the positioning protrusions 58 abut the outer circumferential surface of a cap member 60 that incorporates the electronic circuit device 50 therein, so that the axis of the elastic body 32 is aligned with the rotation axis 14 and the holes 36 are positioned so as to be aligned with the respective corresponding bolts 38.

In addition, a slit 62 is provided in the plate-shaped portion 32B between the two column portions 32A that are adjacent to each other in the circumferential direction. The slit 62 extends straight to the vicinity of the detector element 42 at each end, in parallel with the tangent line of the imaginary circular arc that, when viewed in the axial direction, passes the axes 32C of the holes 36 and of which the center is located at the rotation axis 14. The slit 62 extends in the thickness direction of the plate-shaped portion 32B so as to pass through the plate-shaped portion 32B in the thickness direction and each end of the slit 62 has an isosceles triangle shape.

When a stress is applied to the elastic body 32 and the plate-shaped portion 32B is elastically deformed, the stress is concentrated at each end portion of the slit 62 that has an elongated hexagonal shape, so that the amount of elastic deformation of the plate-shaped portion 32B in the regions, in each of which the detector element 42 is provided, increases. Thus, the slits 62 provide the stress concentration portions that increase the strain of the plate-shaped portion 32B in the regions, in each of which the detector element 42 is provided, by concentrating the stress that is applied to the plate-shaped portion 32B.

The shape of the slits 62 is not limited to the elongated hexagonal shape. The slits 62 may have any shape, such as a rhombus shape or a triangular shape, as long as the slits can increase the strain of the plate-shaped portion 32B in the regions, in each of which the detector element 42 is provided. The number of the slits 62 that are provided between the two column portions 32A that are adjacent to each other in the circumferential direction is not limited to one. For example, one slit 62 may be provided for each of the detector elements 42 in the vicinity thereof. In addition, the thickness of the plate-shaped portion 32B may be set to a value that is greater than the thickness in the case of the first embodiment.

According to the second embodiment shown in the drawings, as in the case of the first embodiment described above, the stresses Fx1 to Fx4 in the rotation direction of the tire/wheel assembly 10 that are applied to the positions of the bolts 38 are determined based on the strain of the plate-shaped portion 32B and it is possible to accurately calculate the longitudinal force Fxt that is exerted by the road surface 56 on the tire 18, based on the above stresses Fx1 to Fx4.

In particular, according to the second embodiment shown in the drawings, the column portions 32A have an oval cross section that is elongated in the radial direction of the tire/wheel assembly 10 and in the portions other than the opposite ends of each of the column portions 32A along the major axis thereof, the column portions 32A are connected to the plate-shaped portion 32B through the base portions 32D that have a circular cross section. Thus, as compared to the case where the base portions 32D are not provided, the amount of elastic deformation of the plate-shaped portion 32B is small and the stiffness required of the elastic body 32 is therefore lower than that required in the cases of the other embodiments.

According to the second embodiment, the slit 62 is provided in the plate-shaped portion 32B at the position between the two column portions 32A that are adjacent to each other in the circumferential direction and the slit 62 functions as the stress concentration portion that concentrates the stress that is applied to the plate-shaped portion 32B.

Thus, the strain of the plate-shaped portion 32B in the regions, in each of which the detector element 42 is provided, is increased by the slits 62, so that it is possible to set the thickness of the plate-shaped portion 32B to a greater value as compared to the case where the slits 62 are not provided. Thus, it is possible to reduce the unnecessary deformation of the plate-shaped portion 32B that is caused when the elastic body 32 is transported or installed.

According to the second embodiment, the tips of the positioning protrusions 58 abut the outer circumferential surface of the cap member 60, which results in positioning of the elastic body 32. Thus, as compared to the case where the positioning protrusions 58 are not provided, the elastic body 32 is easily and accurately positioned so that the axis of the elastic body 32 is aligned with the rotation axis 14 and the holes 36 are positioned so as to be aligned with the respective corresponding bolts 38.

(Third Embodiment)

Figure 8:
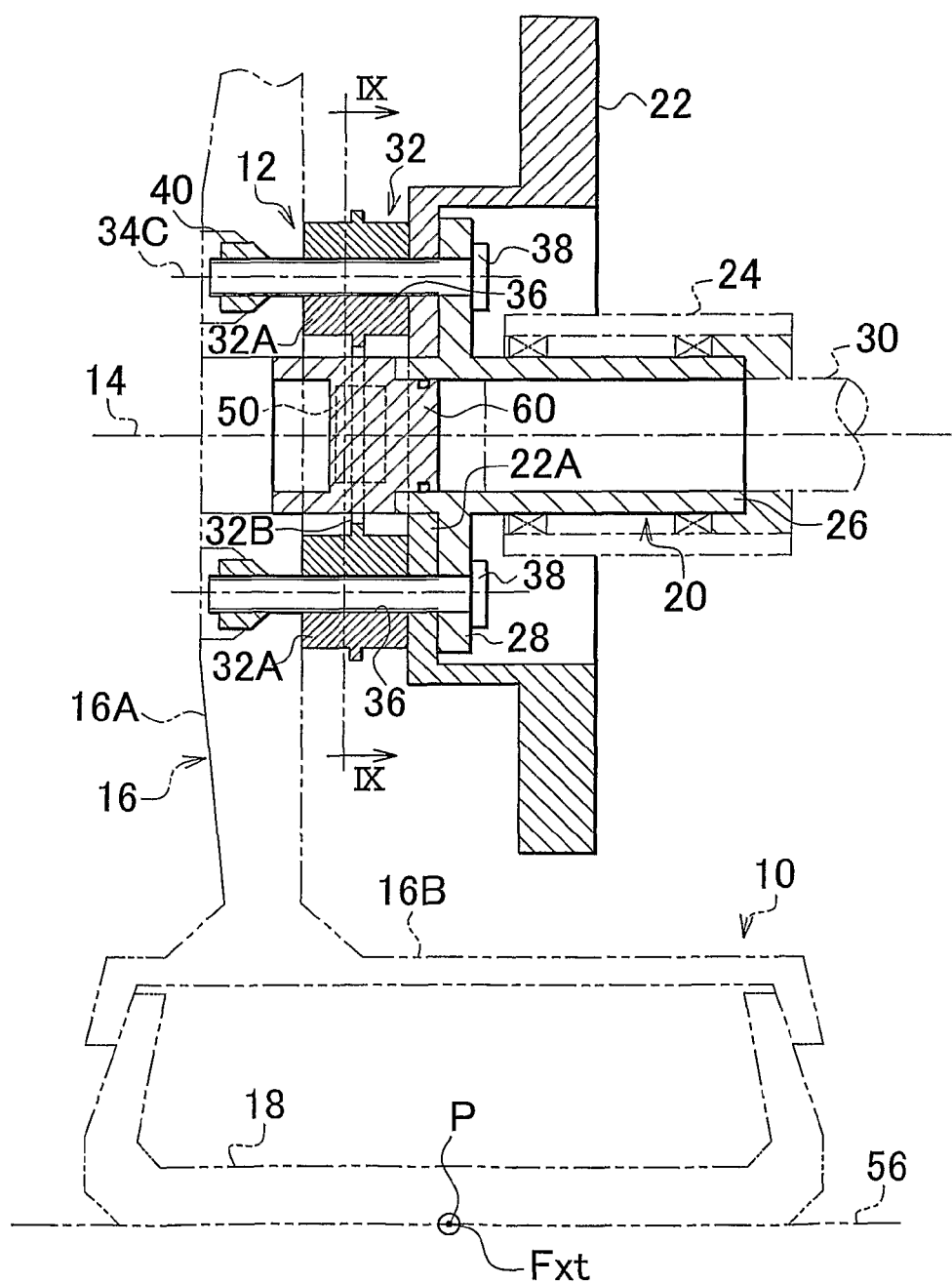
FIG. 8 is a sectional view taken along the cutting plane (the line VIII-VIII of FIG. 9) that passes the rotation axis of the tire/wheel assembly, showing a third embodiment of the tire force detection apparatus according to the invention.
Figure 9:
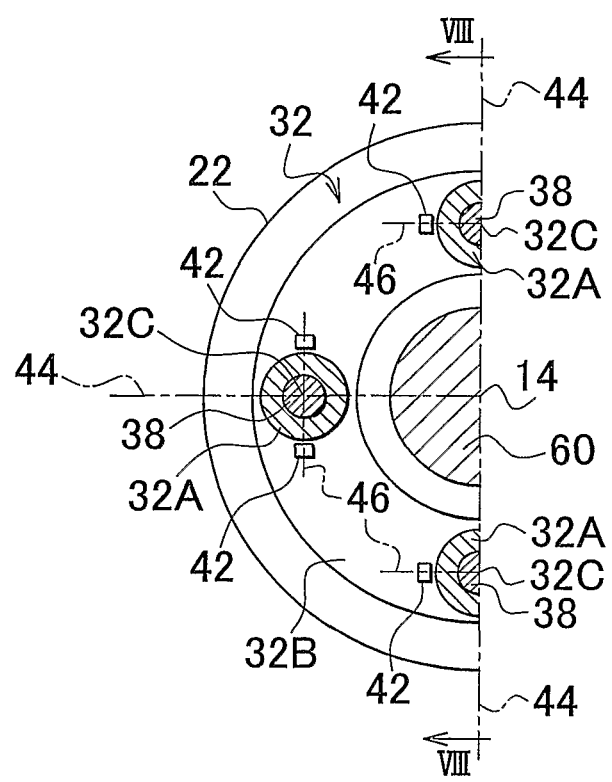
FIG. 9 is a sectional view taken along the line IX-IX of FIG. 8, showing a main portion of an elastic body of the third embodiment.

FIG. 8 is a sectional view taken along the cutting plane (the line VIII-VIII of FIG. 9) that passes the rotation axis of the tire/wheel assembly, showing a third embodiment of the tire force detection apparatus according to the invention. FIG. 9 is a sectional view taken along the line IX-IX of FIG. 8, showing a main portion of an elastic body of the third embodiment.

The third embodiment is a modification of the second embodiment described above. In the third embodiment, the column portions 32A of the elastic body 32 have a cylindrical shape. The plate-shaped portion 32B of the elastic body 32 has an annular plate shape as in the case of the first embodiment described above and has an inner diameter that is greater than the outer diameter of the cap member 60 that incorporates the electronic circuit device 50 therein.

The hole 36 provided in each of the column portions 32A has a constant diameter throughout its length as in the case of the second embodiment described above. The diameter of the holes 36 is substantially equal to or slightly greater than the diameter of the bolts 38, so that the holes 36 receive the bolts 38 not in a press-fitting manner but in a substantially close-contact manner.

The plate-shaped portion 32B is not provided with the stress concentration portion, such as the slit 62 of the second embodiment described above. The thickness of the plate-shaped portion 32B is set to a value smaller than the thickness of the plate-shaped portion 32B of the second embodiment.

Thus, according to the third embodiment shown in the drawings, as in the cases of the first and second embodiments described above, the stresses Fx1 to Fx4 in the rotation direction of the tire/wheel assembly 10 that are applied to the positions of the bolts 38 are determined based on the strain of the plate-shaped portion 32B and it is possible to accurately calculate the longitudinal force Fxt that is exerted by the road surface 56 on the tire 18, based on the above stresses Fx1 to Fx4.

In particular, according to the third embodiment, the column portions 32A have a simple cylinder shape and the plate-shaped portion 32B has a simple annular shape. Thus, the shape of the elastic body 32 is simpler than the shape thereof in the cases of the other embodiments and it is therefore possible to produce the elastic body 32 at a lower cost.

According to the third embodiment, the column portions 32A receive the respective corresponding bolts 38 in a substantially close-contact manner. Thus, it is possible to align the axis of the elastic body 32 with the rotation axis 14 and to align the axes 32C of the column portions 32A with the axes of the bolts 38 without any special positioning means. The elastic body 32 may be modified so that the column portions 32A receive the respective corresponding bolts 38 at least partially in a loose-fitting manner.

(Fourth Embodiment)

Figure 10:
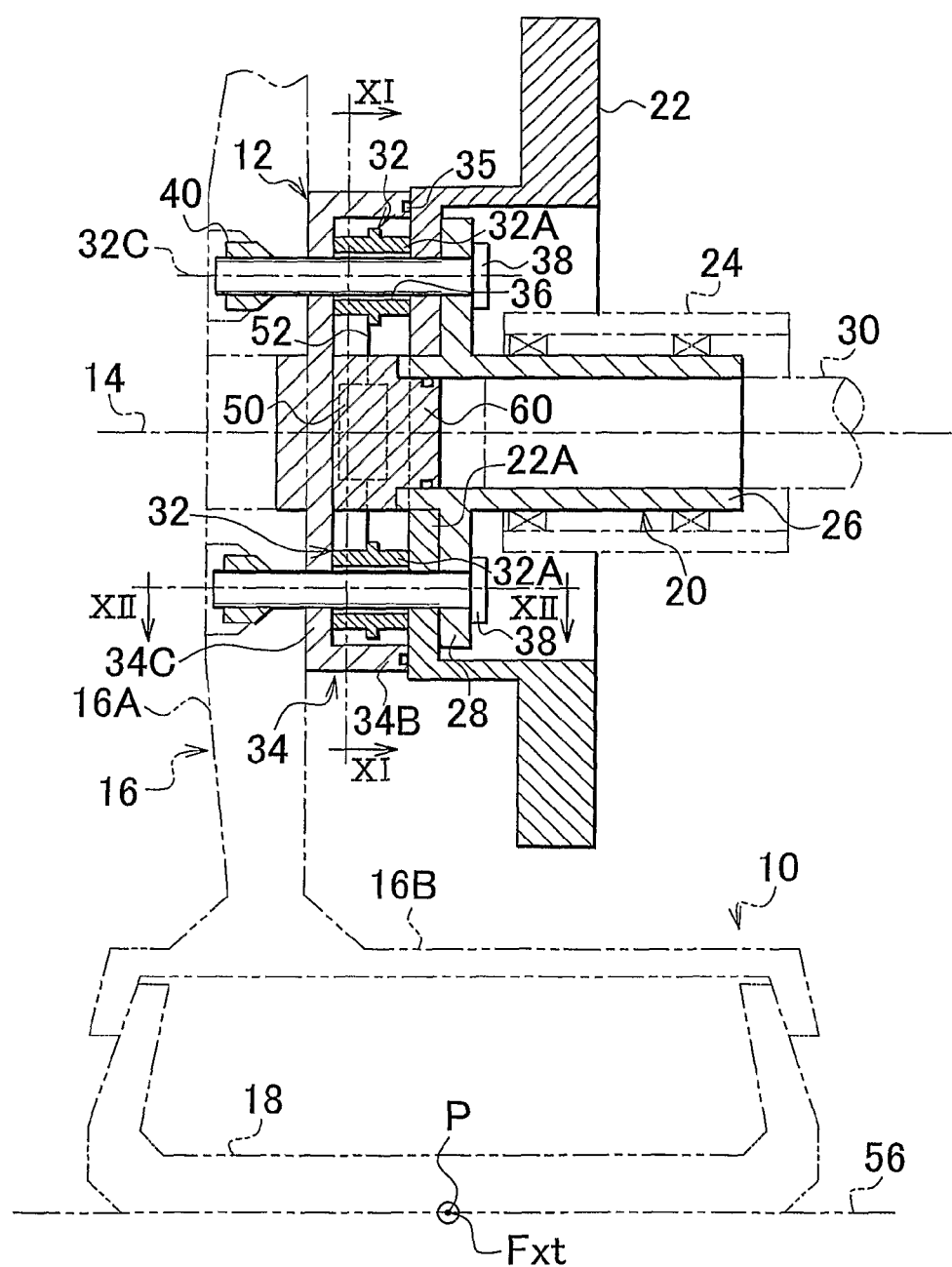
FIG. 10 is a sectional view taken along the cutting plane (the line X-X of FIG. 11) that passes the rotation axis of the tire/wheel assembly, showing a fourth embodiment of the tire force detection apparatus according to the invention.
Figure 11:
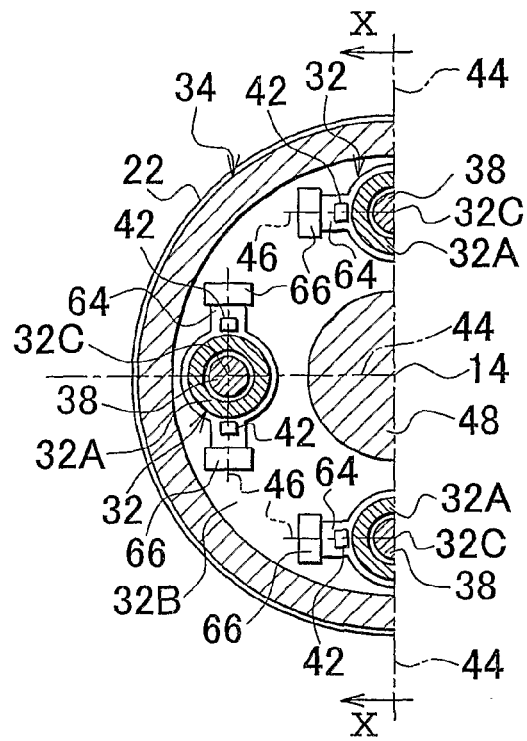
FIG. 11 is a sectional view taken along the line XI-XI of FIG. 10, showing a main portion of the fourth embodiment.
Figure 12:
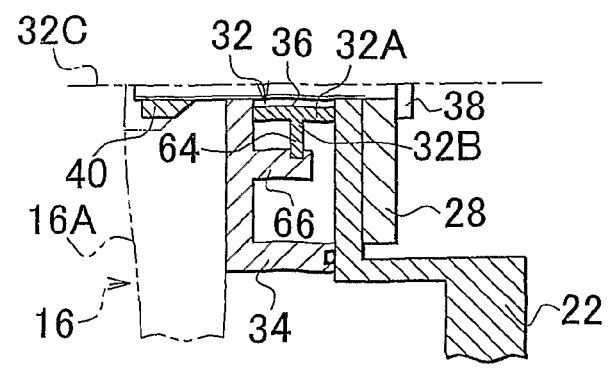
FIG. 12 is a partial sectional view taken along the line XII-XII of FIG. 10, showing a main portion of the fourth embodiment.

FIG. 10 is a sectional view taken along the cutting plane (the line X-X of FIG. 11) that passes the rotation axis of the tire/wheel assembly, showing a fourth embodiment of the tire force detection apparatus according to the invention. FIG. 11 is a sectional view taken along the line XI-XI of FIG. 10, showing a main portion of the fourth embodiment. FIG. 12 is a partial sectional view taken along the line XII-XII of FIG. 10, showing a main portion of the fourth embodiment.

The fourth embodiment is a modification of the first embodiment described above. In the fourth embodiment, the cover member 34 is provided as in the case of the first embodiment described above. The elastic body 32 does not have an annular shape that extends around the rotation axis 14. Four elastic members 32 are disposed at positions that are spaced apart from each other at 90-degree intervals in the circumferential direction around the rotation axis 14 of the tire/wheel assembly 10.

The column portions 32A of the elastic body 32 are not passed through the disc portion 34A of the cover member 34 and are placed in a slightly compressed state between the disc portion 34A and the disc portion 22A of the brake rotor disc 22. The column portions 32A have a cylindrical shape. Each of the plate-shaped portions 32B extends only in a small region around the column portion 32A.

The plate-shaped portion 32B of each of the elastic bodies 32 has a pair of belt-shaped support portions 64 that are integral with the plate-shaped portion 32B and extend along the straight line 46 and each of the elastic bodies 32 is symmetric about the plane 44 extending in the radial direction. Supporting bases 66 are integrally formed on the inner side of the disc portion 34A of the cover member 34 at positions that are spaced apart from each of the column portions 32A in the direction along the straight line 46.

The tips of the supporting bases 66 are press-fitted into the grooves provided in the supporting bases 66. Thus, the elastic bodies 32 are supported by the supporting bases 66 in a state where the holes 36 of the column portions 32A are aligned with the holes that receive the bolts 38 and that are provided in the disc portion 22A of the brake rotor disc 22 and the disc portion 34A of the cover member 34. The holes in the disc portions 22A and 34A have a diameter such that the holes receive the bolts 38 in a close-contact manner. The holes 36 have a diameter such that the holes 36 receive the bolts 38 in a loose-fitting manner.

In addition, the electronic circuit device 50 is not incorporated in the cover member 34 and the cap member 60 that incorporates the electronic circuit device 50 therein is disposed between, the disc portion 34A of the cover member 34 and the shaft portion 26 in a state where the cap member 60 is partially fitted into the shaft portion 26 of the hub member 20.

According to the fourth embodiment shown in the drawings, as in the cases of the first to third embodiments described above, the stresses Fx1 to Fx4 in the rotation direction of the tire/wheel assembly 10 that are applied to the positions of the bolts 38 are determined based on the strain of the plate-shaped portion 32B and it is possible to accurately calculate the longitudinal force Fxt that is exerted by the road surface 56 on the tire 18, based on the above stresses Fx1 to Fx4.

In particular, according to the fourth embodiment, the tips of the support portion 64 of each of the elastic bodies 32 are press-fitted into the grooves provided in the supporting bases 66, respectively, whereby the elastic bodies 32 are fixed to the disc portion 34A of the cover member 34. Thus, it is possible to reliably align the holes 36 of the column portions 32A of the elastic bodies 32 with the holes, provided in the disc portions 24A and 34A, that receive the bolts 38 and it is therefore possible to reliably align the axes 32C of the column portions 32A with the axes of the bolts 38.

According to the fourth embodiment, the column portions 32A receive the bolts 38 in a loose-fitting manner throughout its length. Thus, as compared to the case where the column portions 32A receive the bolts 38 at least partially in a close-contact manner, it is possible to more reliably prevent the bolts 38 from obstructing the elastic deformation of the column portions 32A and the plate-shaped portions 32B.

According to the fourth embodiment, the four elastic bodies 32 are provided and are separate from each other. Thus, as compared to the cases of the other embodiments, in which the four column portions 32A are integrally connected by the single annular plate-shaped portion 32B, it is possible to more reliably prevent the column portions 32A that are adjacent to each other from mutually affecting the elastic deformation of the surrounding plate-shaped portion 32B.

(Fifth Embodiment)

Figure 13:
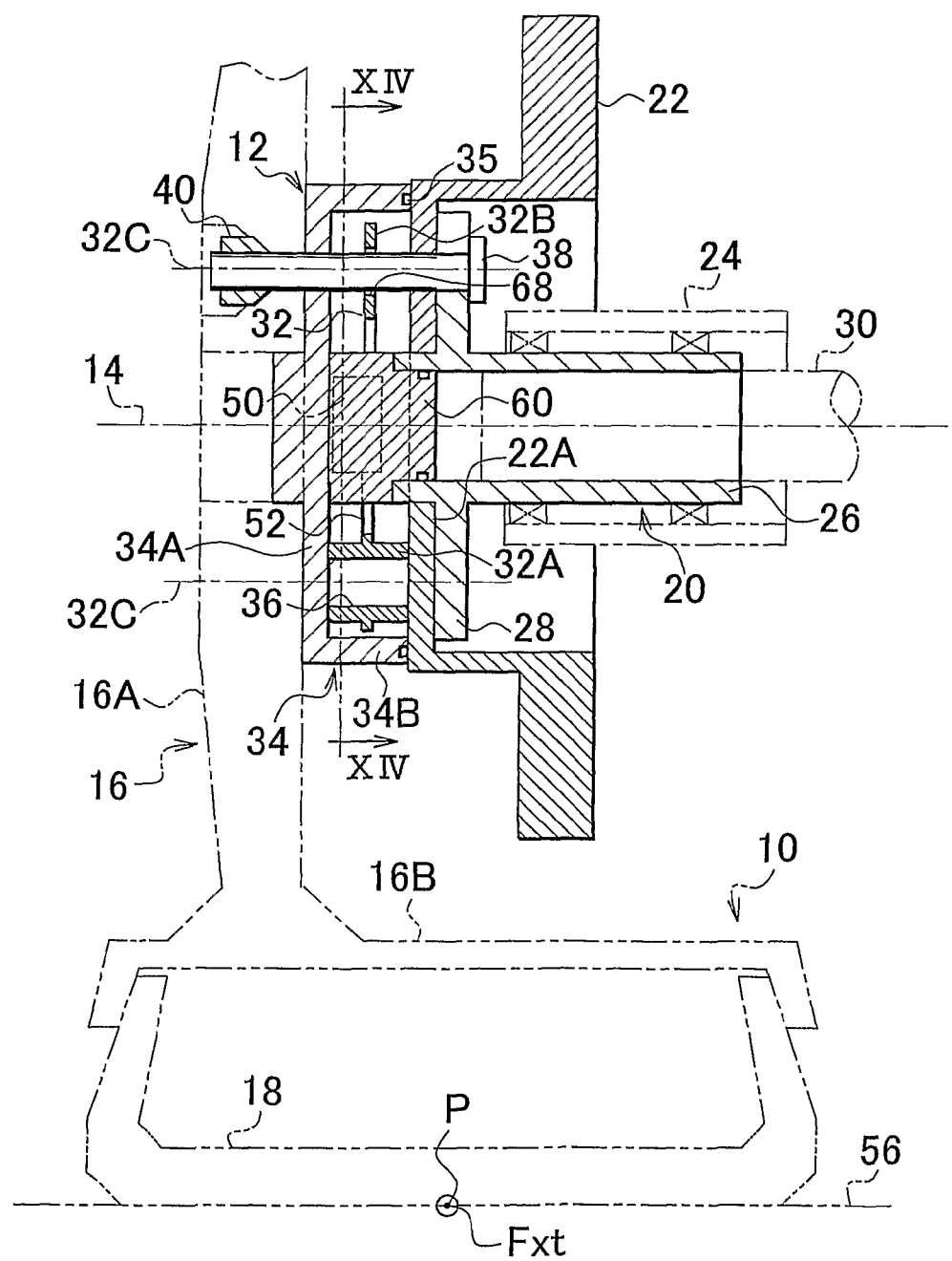
FIG. 13 is a sectional view taken along the cutting plane (the line XIII-XIII of FIG. 14) that passes the rotation axis of the tire/wheel assembly, showing a fifth embodiment of the tire force detection apparatus according to the invention.
Figure 14:
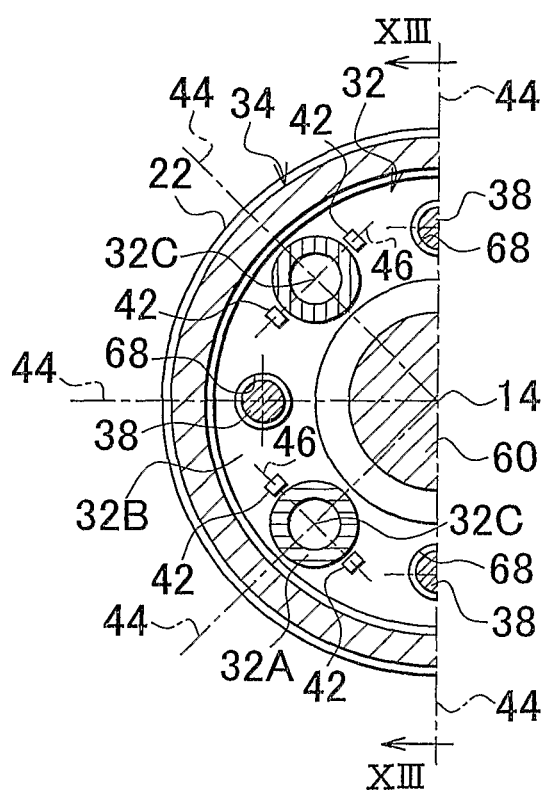
FIG. 14 is a sectional view taken along the line XIV-XIV of FIG. 13, showing a main portion of the fifth embodiment.

FIG. 13 is a sectional view taken along the cutting plane (the line XIII-XIII of FIG. 14) that passes the rotation axis of the tire/wheel assembly, showing a fifth embodiment of the tire force detection apparatus according to the invention. FIG. 14 is a sectional view taken along the line XIV-XIV of FIG. 13, showing a main portion of the fifth embodiment.

The fifth embodiment is a modification of the third embodiment described above. In the fifth embodiment, as in the case of the third embodiment, the column portions 32A of the elastic body 32 have a cylindrical shape. The plate-shaped portion 32B of the elastic body 32 has an annular plate shape as in the case of the first embodiment described above and has an inner diameter greater than the outer diameter of the cap member 60 that incorporates the electronic circuit device 50 therein. The column portions 32A may be solid columns rather than cylinders.

As in the case of the third embodiment described above, the column portions 32A are provided at positions that are spaced apart from each other at 90-degree intervals in the circumferential direction around the rotation axis 14 of the tire/wheel assembly 10. Holes 68 that receive the bolts 38 in a loose-fitting manner are provided at positions that are spaced apart from the column portions 32A at 45-degree intervals in the circumferential direction around the rotation axis 14.

The annular cover plate (not shown) may be disposed to abut the disc portion 22A of the brake rotor disc 22. In this case, the bolts 38 pass through and extend beyond the cover plate and the plate-shaped portion 32B of the elastic body 32 and the bolts 38 are fitted into the holes provided in the plate-shaped portion 32B in a close-contact manner. The tip of the cylindrical portion of the cover member 34 and one end of each of the column portions 32A abut the cover plate. Note that the cover plate may be omitted.

According to the fifth embodiment shown in the drawings, as in the cases of the first to fourth embodiments described above, the stresses Fx1 to Fx4 in the rotation direction of the tire/wheel assembly 10 that are applied to the positions of the column portions 32A are determined based on the strain of the plate-shaped portion 32B and it is possible to accurately calculate the longitudinal force Fxt that is exerted by the road surface 56 on the tire 18, based on the above stresses Fx1 to Fx4.

In particular, according to the fifth embodiment, the column portions 32A are not fitted onto the bolts 38 and are spaced apart from the bolts 38 in the circumferential direction of the tire/wheel assembly 10. Thus, it is possible to calculate the longitudinal force Fxt that is exerted by the road surface 56 on the tire 18 without any restrictions on the positions of the column portions 32A caused by the positions of the bolts 38.

According to the fifth embodiment, the bolts 38 are fitted, in a close-contact manner, into the holes that are provided in the plate-shaped portion 32B. Thus, it is possible to reliably align the axis of the elastic body 32 with the rotation axis 14 and at the same time, it is possible to easily and accurately position the column portions 32A at predetermined positions.

In the above description, particular embodiments of the invention have been described in detail. However, the invention is not limited to the above embodiments. It should be obvious to those skilled in the art that various other embodiments are possible within the scope of the invention.

For example, while the cover member is not provided in the second and third embodiments described above, a cover member that is similar to the cover member 34 of the first embodiment, for example, may be provided. On the other hand, the cover member 34 may be omitted from the first, fourth, and fifth embodiment.

While the column portions 32A pass through and extend beyond the cover member 34 in the above-described first embodiment, the end portions of the column portions 32A may abut the disc portion 34A of the cover member 34. On the other hand, the column portions 32A may pass through and extend beyond the cover member 34 in the fourth and fifth embodiments, as in the case of the first embodiment.

While the compressive stress limiting means that limits the compressive stress that is applied to the column portions 32A of the elastic body 32 is not provided in the second and third embodiments described above, the compressive stress limiting means may be provided also in these embodiments. For example, a configuration may be employed, in which the cap member 60 is provided with a shoulder portion that abuts the disc portion 16A of the wheel 16 so that the cap member 60 functions as the compressive stress limiting means that limits the compressive stress that is applied to the column portions 32A of the elastic body 32.

In the embodiments described above, the cross section of the column portion 32A has a circular or oval shape. However, the cross section of the column portion 32A may be any shape, such as a polygonal shape or an elliptic shape. Similarly, while the plate-shaped portion 32B has an annular plate shape in the above embodiments except the fourth embodiment, the plate-shaped portion 32B may have any shape, such as a polygonal shape.

While the correction of the stress based on the temperature of the elastic body 32 is not performed in the cases of the above-described embodiments, a modification may be made, in which the temperature of the elastic body 32, in particular, the temperature of the plate-shaped portion 32B is detected and the stresses fx11 etc. or the stresses Fx1 to Fx4 that are applied in the rotation direction of the tire/wheel assembly 10 may be corrected based on the detected temperature.

While the vertical force exerted by the road surface 56 on the tire 18 is not calculated in the above-described embodiments, the difference between the stresses detected by the pair of detector elements 42 that are provided on opposite sides of each of the column portions 32A sinusoidally varies with the rotation of the tire/wheel assembly 10, so that the vertical force that is exerted by the road surface 56 on the tire 18 may be calculated by matrix operation based on the sinusoidal variation of the difference between the stresses.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations are also within the scope of the invention.

The invention claimed is:

1. A tire force detection apparatus for detecting a force exerted on a tire at a contact point of the tire, comprising:
    a tire/wheel assembly that has a wheel having a disc portion that extends perpendicularly to a rotation axis of the tire/wheel assembly and a tire that is held on an outer circumferential portion of the wheel;
    a wheel support member for supporting the wheel via a wheel support portion so that the wheel can rotate about the rotation axis, the wheel support portion being supported by a vehicle body so as to be able to rotate about the rotation axis and extending perpendicularly to the rotation axis;
    a connecting member that connects the disc portion of the wheel and the wheel support portion of the wheel support member;
    an elastic body disposed between the disc portion and the wheel support portion, the elastic body including a column portion that extends in parallel with the rotation axis and that abuts, at opposite ends faces thereof, the disc portion and the wheel support portion and a plate-shaped portion that is integrated with the column portion between the opposite ends faces thereof and extends around the column portion, the plate-shaped portion being located apart from the disc portion and the wheel support portion;
    a stress detector that detects stress applied to the elastic body by detecting a strain of the plate-shaped portion; and
    a calculation unit that calculates the force exerted on the tire, based on the stress detected.

2. The tire force detection apparatus according to claim 1, wherein the elastic body has a plurality of column portions that are disposed spaced apart from each other around the rotation axis and the plate-shaped portion integrally connects each pair of the column portions that are adjacent to each other in a circumferential direction.

3. The tire force detection apparatus according to claim 1, wherein the plate-shaped portion has a stress concentration portion that increases the strain of the plate-shaped portion in a region, in which the stress detector is provided, by concentrating the stress that is applied to the plate-shaped portion due to the stress applied to the elastic body.

4. The tire force detection apparatus according to claim 1, wherein the stress detector is disposed, with respect to an axis of the column portion, in a direction perpendicular to a radial direction of the tire/wheel assembly when viewed along the rotation axis.

5. The tire force detection apparatus according to claim 1, wherein the connecting member extends in parallel with the rotation axis and the column portion is a hollow cylinder, through which the connecting member passes.

6. The tire force detection apparatus according to claim 1, wherein the column portion is disposed, with respect to the connecting member, in a circumferential direction about the rotation axis.

7. The tire force detection apparatus according to claim 1, further comprising a compressive stress limiting member that bears at least part of compressive stress that is applied from the disc portion and the wheel support portion to the column portion, thereby limiting compressive stress that is applied to the column portion.

8. The tire force detection apparatus according to claim 1, wherein the calculation unit calculates the stress that is applied in a rotation direction of the tire/wheel assembly at the elastic body based on the stress applied to the elastic body and calculates a force that is exerted on the tire in a longitudinal direction at the contact point of the tire, based on the stress applied in the rotation direction of the tire/wheel assembly.

* * * * *